(12) United States Patent
Dann

(10) Patent No.: US 10,041,626 B2
(45) Date of Patent: Aug. 7, 2018

(54) LUBRICANT APPLICATOR

(71) Applicant: Brenda Lee Dann as trustee for the HAD'A THOUGHT FAMILY TRUST, Brisbane (AU)

(72) Inventor: Ian Dann, Roma (AU)

(73) Assignee: Brenda Lee Dann as trustee for the HAD'A THOUGHT FAMILY TRUST, Brisbane (AU)

( * ) Notice: Subject to any disclaimer, the term of this patent is extended or adjusted under 35 U.S.C. 154(b) by 343 days.

(21) Appl. No.: 14/766,536

(22) PCT Filed: Feb. 3, 2014

(86) PCT No.: PCT/AU2014/000073
§ 371 (c)(1),
(2) Date: Aug. 7, 2015

(87) PCT Pub. No.: WO2014/121321
PCT Pub. Date: Aug. 14, 2014

(65) Prior Publication Data
US 2015/0377412 A1    Dec. 31, 2015

(30) Foreign Application Priority Data

Feb. 8, 2013    (AU) .................. 2013200668

(51) Int. Cl.
| | | |
|---|---|---|
| *F16N 3/08* | (2006.01) | |
| *F16N 7/12* | (2006.01) | |
| *F16N 3/00* | (2006.01) | |
| *F16N 3/12* | (2006.01) | |
| B65D 47/42 | (2006.01) | |
| F16B 33/06 | (2006.01) | |

(52) U.S. Cl.
CPC ............... *F16N 3/08* (2013.01); *F16N 3/00* (2013.01); *F16N 3/12* (2013.01); *F16N 7/12* (2013.01); *B65D 47/42* (2013.01); *F16B 33/06* (2013.01)

(58) Field of Classification Search
CPC ..... F16N 3/08; F16N 3/00; F16N 7/12; F16N 3/12
USPC .................. 184/28, 14, 102, 105.2
See application file for complete search history.

(56) References Cited

U.S. PATENT DOCUMENTS

| | | | | |
|---|---|---|---|---|
| 1,567,111 A | * | 12/1925 | Burr ..................... | F16N 7/12 |
| | | | | 118/270 |
| 1,662,842 A | * | 3/1928 | Albertine .................. | F16N 3/12 |
| | | | | 137/539 |
| 2,487,642 A | * | 11/1949 | De Waltoff ........ | B65D 83/0016 |
| | | | | 222/320 |

(Continued)

FOREIGN PATENT DOCUMENTS

| | | |
|---|---|---|
| AU | 2011204832 | 2/2012 |
| DE | 41 01 785 | 7/1992 |

(Continued)

*Primary Examiner* — William E Dondero
*Assistant Examiner* — Mark K Buse
(74) *Attorney, Agent, or Firm* — Boyle Fredrickson S.C.

(57) ABSTRACT

The present invention relates to a lubricant applicator for applying lubricant to a fastener. The applicator includes engagement means for engaging with and applying lubricant to the fastener. The engagement means typically includes an absorbent felt liner. The applicator further includes a dispenser for dispensing lubricant to the engagement means.

15 Claims, 6 Drawing Sheets

(56) References Cited

U.S. PATENT DOCUMENTS

| | | | | |
|---|---|---|---|---|
| 3,889,628 A * | 6/1975 | Usab | ............... | B05B 11/0051 |
| | | | | 118/306 |
| 4,091,894 A * | 5/1978 | Lang | ............... | F01M 11/061 |
| | | | | 184/103.1 |
| 4,790,259 A * | 12/1988 | Morris | ............... | B05C 1/025 |
| | | | | 118/266 |
| 5,445,243 A * | 8/1995 | Coffey | ............... | F16N 7/12 |
| | | | | 184/102 |
| 5,520,737 A * | 5/1996 | Denton | ............... | B05C 3/09 |
| | | | | 118/400 |
| 5,743,359 A * | 4/1998 | Parnell | ............... | F16N 7/00 |
| | | | | 118/268 |
| 6,010,263 A * | 1/2000 | White | ............... | B43K 5/1845 |
| | | | | 401/131 |
| 6,234,698 B1 * | 5/2001 | De Laforcade | ...... | A45D 40/04 |
| | | | | 401/175 |
| 6,467,579 B1 * | 10/2002 | Simon | ............... | F16N 3/12 |
| | | | | 184/105.2 |
| 6,520,292 B1 * | 2/2003 | Kurtz | ............... | F16C 33/6622 |
| | | | | 184/28 |
| 8,517,146 B2 * | 8/2013 | Drew | ............... | F16L 55/1155 |
| | | | | 138/89 |
| 8,701,591 B2 * | 4/2014 | Presley | ............... | A46B 11/00 |
| | | | | 118/423 |
| 2004/0084482 A1 * | 5/2004 | Sumner | ............... | F16N 3/00 |
| | | | | 222/387 |
| 2006/0151540 A1 * | 7/2006 | Ling | ............... | F16N 3/12 |
| | | | | 222/262 |
| 2009/0057059 A1 * | 3/2009 | Wu | ............... | F16N 11/02 |
| | | | | 184/5.1 |

FOREIGN PATENT DOCUMENTS

| | | |
|---|---|---|
| DE | 10 2007 051 901 | 6/2009 |
| JP | 08042786 | 2/1996 |

* cited by examiner

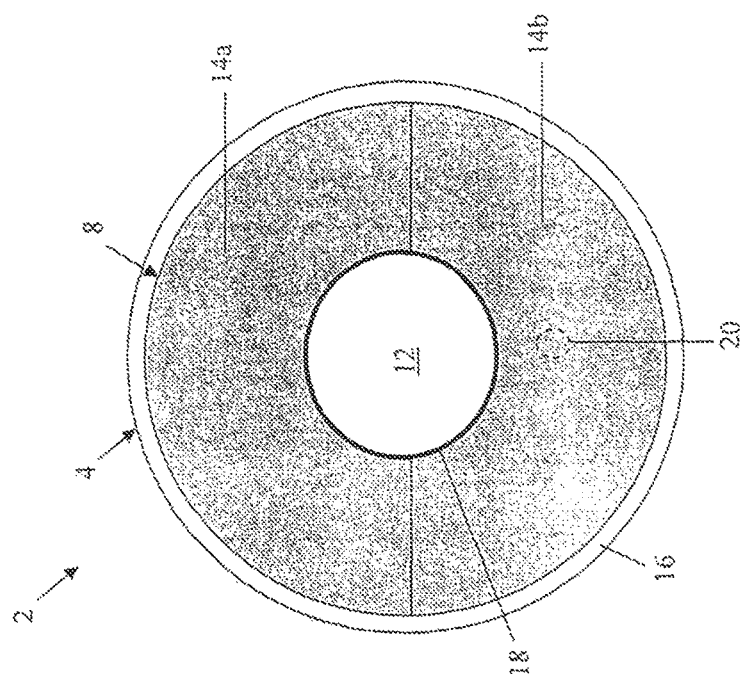
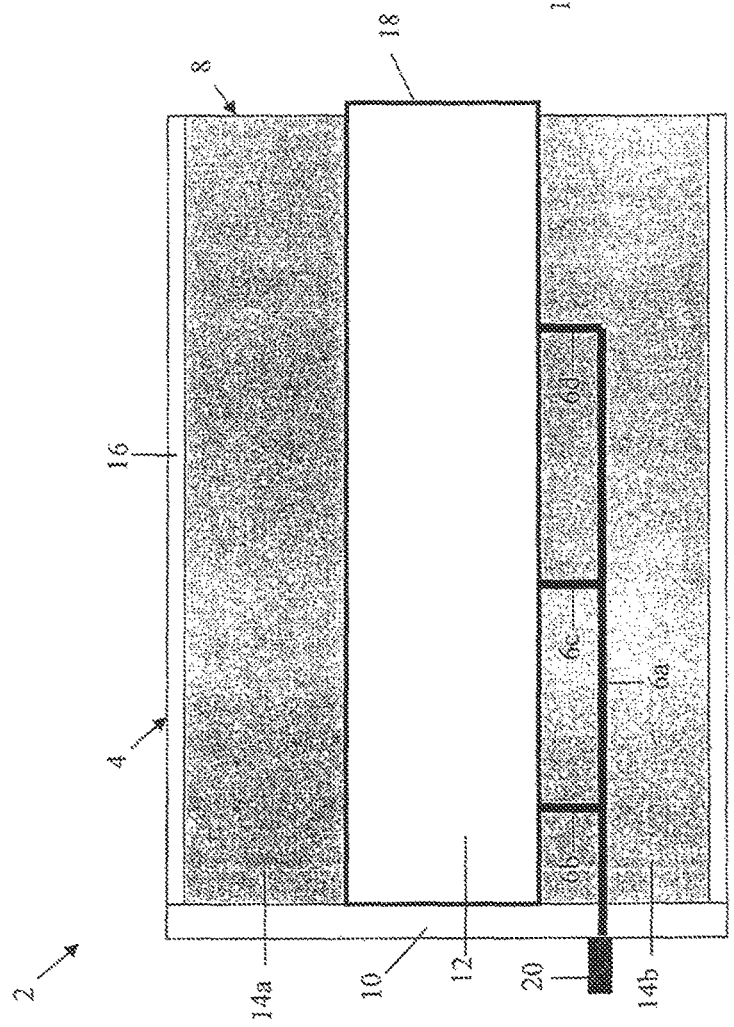
FIG. 1b
FIG. 1a

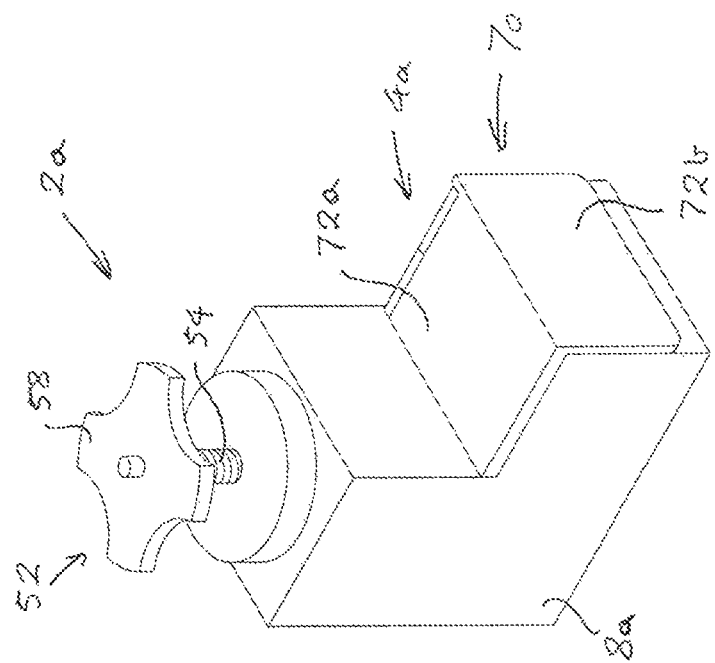
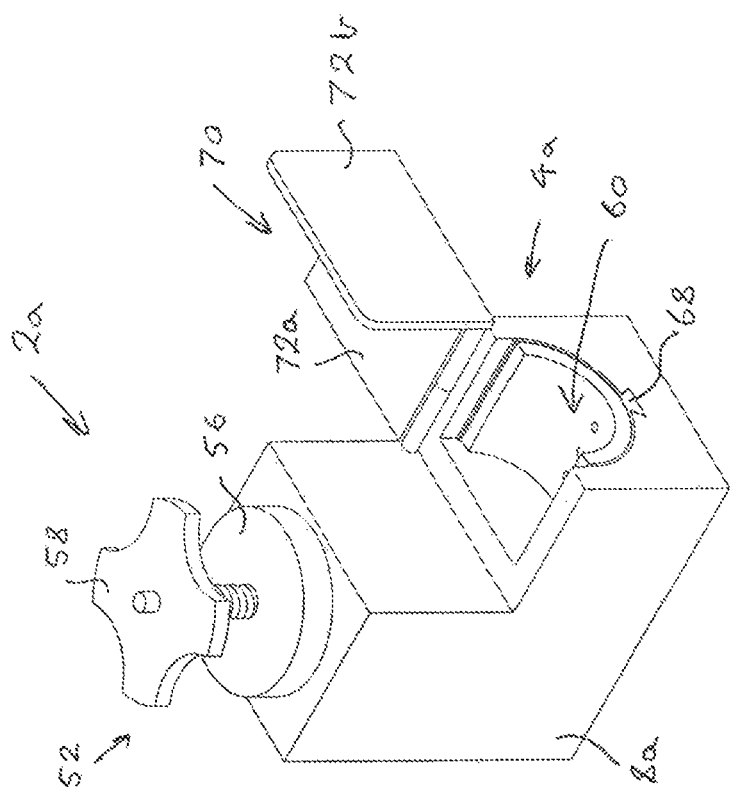

LUBRICANT APPLICATOR

TECHNICAL FIELD

The present invention relates to an industrial lubricant applicator for applying lubricant to a fastener. The present invention has particular, although not exclusive application to fasteners used on industrial pipelines.

BACKGROUND

The reference to any prior art in this specification is not, and should not be taken as an acknowledgement or any form of suggestion that the prior art forms part of the common general knowledge.

Industrial gas pipelines include a network of pipes transporting gas. The pipes are fastened together with fasteners which typically include a threaded bolt with which a nut can engage, or a shaft with threaded ends to which a pair of nuts can be oppositely engaged. In practice, the fasteners need to be released when maintaining the pipeline and invariably nuts are difficult to remove from their threaded fastener shafts.

Lubricant can be brush applied around the threaded fastener shaft during pipeline installation so that the nut can more readily be removed from the shaft during maintenance. In practice, applying the lubricant with a brush is an awkward, often messy and labour intensive task.

It is an object of the present invention to provide an alternative means for applying lubricant to a fastener.

SUMMARY OF THE INVENTION

According to an aspect of the present invention, there is provided an industrial lubricant applicator for applying lubricant to a fastener, the applicator including:
  engagement means for engaging with and applying lubricant to the fastener;
    a dispenser for dispensing lubricant to the engagement means and comprising a valve to facilitate controlled release of the lubricant; and
    a lubricant reservoir for providing pressurised lubricant to the dispenser for release by the valve.

Preferably, the engagement means includes a liner. The liner may be absorbent felt for storing the lubricant and for lubricating within the thread of the fastener. Advantageously, the absorbent felt provides for even distribution of the lubricant.

The valve may include a stopper, and biasing means (e.g. compression spring) for biasing the stopper in a normally closed configuration. The valve may be opened to dispense lubricant by pushing the stopper. The stopper may include a pin with a flared end for passing through an O-ring and compression spring, and a terminus for terminating the pin.

The dispenser may include an applicator head defining an internal thread for engaging with a lubricant reservoir. The applicator head may further define a central conduit for housing a valve and through which lubricant can be conveyed to the absorbent liner. The head may further include a flat mounting interface to facilitate mounting of the dispenser. The dispenser can be mounted to facilitate one handed operation of the dispenser.

The applicator may include a liner support for supporting the liner and mounting to the applicator head. The support and liner may each define a central aperture through which lubricant can be conveyed and a pair of fastening holes for receiving fasteners extending into the head.

The applicator may further include a cap for capping the liner. The applicator may further include a tether for tethering the cap.

The applicator may further include a magnetic fastener for fastening the head to a metallic surface.

The lubricant reservoir includes a replaceable lubricant canister, a housing for coupling to the applicator head and for housing the canister, a plunger for pushing lubricant from the canister, and a compression spring for pressing against the plunger. The reservoir may further include a handle which can be pulled to disengage the plunger and locked in position.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1a is a side sectional view of a lubricant applicator in accordance with an embodiment of the present invention;

FIG. 1b is an end view of the lubricant applicator of FIG. 1a;

FIG. 4a is a perspective view of the lubricant applicator of FIG. 2 with an open cover;

FIG. 4b is a perspective view of the lubricant applicator of FIG. 2 with a closed cover;

DETAILED DESCRIPTION OF PREFERRED EMBODIMENTS

Figure 2:
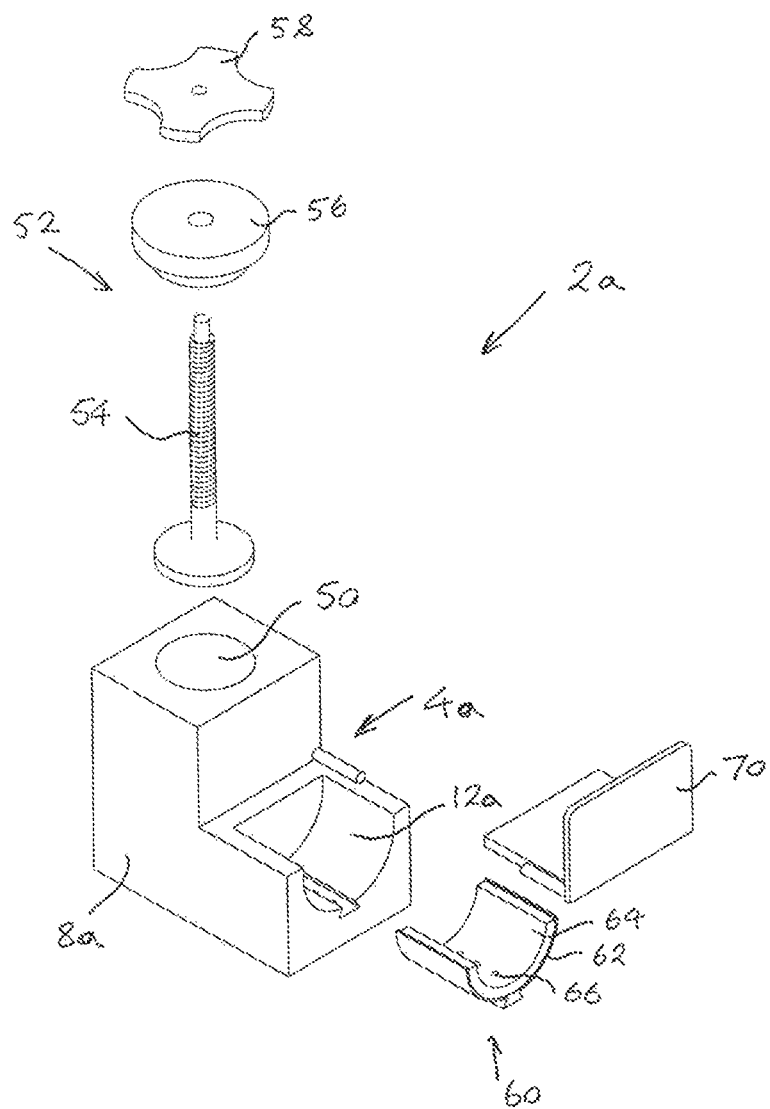
FIG. 2 is a exploded perspective view of a lubricant applicator in accordance with a second embodiment of the present invention.

According to an embodiment of the present invention, there is provided a lubricant applicator 2 as shown in FIG. 1. The lubricant applicator 2 is suitable for applying lubricant (e.g. grease) to the threaded shaft of a fastener (not shown). The applicator 2 includes a cylindrical receptacle 4 for receiving the shaft of the fastener. The receptacle 4 defines one or more internal passages 6 through which lubricant can be provided to the fastener within the receptacle 4. The fastener shaft can be received in the receptacle 4 which, in turn, can be simply turned to apply lubricant contained within the receptacle 4 to the fastener shaft.

The receptacle 4 includes an annular body 8, and an endplate 10 fastened to the body 8 to define a central well 12. The annular body 8 includes two nylon halves 14a, 14b each having a semicircular profile. The receptacle 4 also includes an outer sheath 16 (e.g. adhesive tape) bounding the nylon halves 14a, 14b together. The receptacle 4 also includes an inner lining 18 for absorbing lubricant provided through the passages 6 and being received within a thread of the fastener during lubrication of the fastener. The lining 18 is replaceable and protrudes from the receptacle 4 to facilitate removal with a pair of pliers. The lining 18 includes a plastic backing layer (or sheet) to which a felt sheet is adhered.

The applicator 2 further includes a connector 20 in fluid communication with the internal passages 6 defined in the annular body 8, and to which a lubricant supply (e.g. grease gun) can be connected. The connector 20 includes a grease nipple that can be connected to a grease gun which, in turn, can supply grease through the passages 6 and to the absorbent lining 18 bounding the well 12.

The passages 6 include an elongate passage 6a axially extending along the elongate receptacle 4, and a triplet of spaced transverse passages 6b, 6c, 6d transversely extending into the receptacle 4. In practice, the transverse passage 6d need not be provided as grease contained in the receptacle 4 toward the bottom of the well 12 migrates toward the opening of the receptacle 4 as the fasteners are removed from the well 12.

In practice, a grease gun is connected to the connector 20, and supplies grease through the passages 6 and to the absorbent lining 18 bounding the well 12.

The threaded fastener shaft is then snugly inserted into the receptacle well 12 and engages with the absorbent lining 18 bearing lubricant. The user simply rotates the applicator 2 relative to the fastener and the felt passes within the fastener thread depositing lubricant therein.

The lubricated fastener can then be removed from the well and another fastener can then be inserted for lubricating. Typically, may fasteners can be lubricated before more lubricant need be provided from the grease gun to the well 12. Applying grease to the fasteners in this manner is a simple, straightforward and speedy task. Advantageously, grease is largely contained in the applicator 2 so as to reduce any mess.

Figure 3:
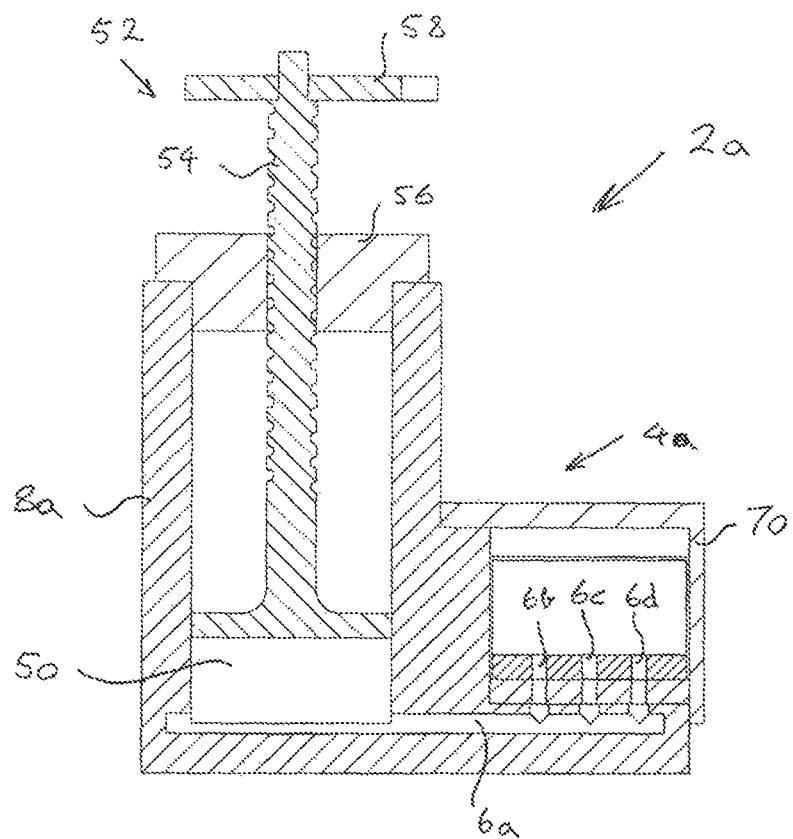
FIG. 3 is a side sectional view of the lubricant applicator of FIG. 2.

According to a second embodiment of the present invention, there is provided another lubricant applicator 2a as shown in FIGS. 2 to 4. Like reference numerals refer to like features previously described.

The lubricant applicator 2a is suitable for applying lubricant to a fastener shaft. The applicator 2a includes a receptacle 4a for receiving the fastener. As can best be seen in FIG. 3, the receptacle 4a defines internal passages 6a, 6b, 6c, 6d through which lubricant can be provided to the fastener. The fastener shaft can be received in the receptacle 4a and the shaft can be simply turned to apply lubricant contained within the receptacle 4a to the shaft.

Turning to FIG. 2, the receptacle 4a includes a body 8a defining a recess 12a in fluid communication with the passages 6 and in which the fastener is received. The body 8a defines a lubricant reservoir 50 in fluid communication with the passages 6. The applicator 2a further includes an actuator 52 for moving lubricant from the reservoir 50, though the passages 6 and into the recess 12a. The actuator 52 includes a threaded plunger 54 having a threaded shaft terminating in a enlarged tail. The actuator 52 further includes a plunger plate 56 fitted within the body 8a and with which the threaded plunger 52 engages to incrementally move the lubricant upon rotation of the plunger 54 relative to the plate 54. A handle 58 can be fitted to the head of the plunger 54.

As can best be seen in FIG. 2, the receptacle 4a further includes a lining module 60 for being received in the recess 12a and for absorbing lubricant to be applied within a thread of the fastener. The lining module 60 defines a semicircular inner face to form a complementarily fit with a cylindrical shaft of the fastener. The lining module 60 includes a support 62 and an absorbent liner 64 mounted within the support 62. Both the support 62 and liner 64 together define apertures 66 in register with the passages 6. The lining module 60 is replaceable and with the body 8a together forms a tongue and groove fit 68 (see FIG. 4a) to facilitate linear removal of the lining module 60 from the body 8a.

Turning to FIG. 4, the applicator further includes a cover 70 for covering the recess 12a. The cover 70 is pivotally mounted to the body 8a with a cap and post arrangement (see FIG. 2). The cover 70 includes a pair of orthogonal panels 72a, 72b for covering both a top and an end of the recess 12a.

Figure 5:
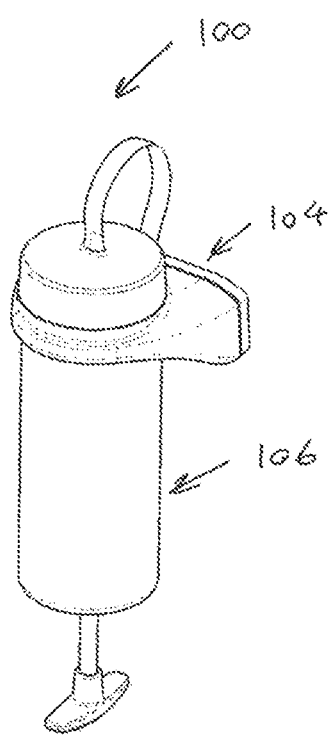
FIG. 5 is an upper perspective view of a lubricant applicator in accordance with another embodiment of the present invention.
Figure 6:
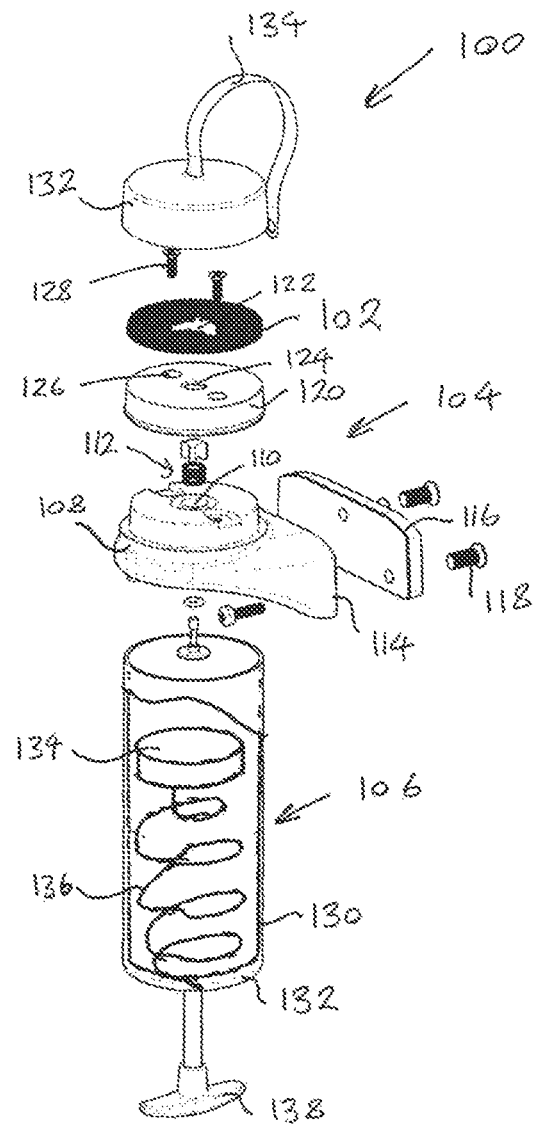
FIG. 6 is an exploded upper perspective view of the lubricant applicator of FIG. 5 showing a sectioned lubricant reservoir.

According to another aspect of the present invention, there is provided a lubricant applicator 100, shown in FIGS. 5 and 6, for applying lubricant to the threaded shaft of an industrial fastener bolt. The applicator 100 includes an absorbent felt liner 102 (i.e. engagement means) for engaging with and applying lubricant to the fastener. An intermediate dispenser 104 dispenses lubricant to the felt liner 102 and, in turn a lowermost lubricant reservoir 106 provides lubricant to the dispenser 104. A detailed description of the lubricant applicator 100 is provided below.

As can best be seen in FIG. 6, the dispenser 104 includes a molded applicator head 108. The head 108 defines a central conduit 110 for housing a spring loaded valve 112 and through which lubricant can be conveyed to the absorbent liner 102. The head 108 further includes a flat mounting interface 114 to facilitate mounting of the dispenser 104. The applicator 100 further includes a magnetic fastener plate 116 for fastening the head 108 to a metallic surface of a workbench. The magnetic plate 116 is screwed to the mounting interface 114 with screws 118.

The applicator 100 includes a molded liner support 120 for supporting the liner 102 and mounting to the applicator head 108. The support 120 caps the top of the head 108. Both the annular liner 102 and support 120 define respective central apertures 122, 124 through which lubricant can be conveyed and in which the valve 112 is located. Both the annular liner 102 and annular support 120 each also define a pair of fastening holes 126 for receiving screw fasteners 128 extending into the head 108.

The lubricant reservoir 106 includes an internal disposable lubricant canister 130 with a movable floor which can be automatically advanced to eject lubricant. An external housing 132 is provided for threadably coupling to the underside of the applicator head 108 and houses the canister 130. An internal plunger 134 presses against the movable canister floor and pushes lubricant from the canister 130. A compression spring 136 extends from the floor of the housing 132, and presses against the plunger 134. The reservoir 106 further includes a handle 138 which can be pulled to disengage the plunger 134 from the canister 130, and rotated to lock the plunger 134 in an unengaged position at the floor of the housing 132 when replacing the canister 130.

The applicator 100 further includes a cap 132 for capping the liner 102. A tether 134 extends from the cap 132 and is typically anchored to the plate 116 with a screw 118.

Figure 7:
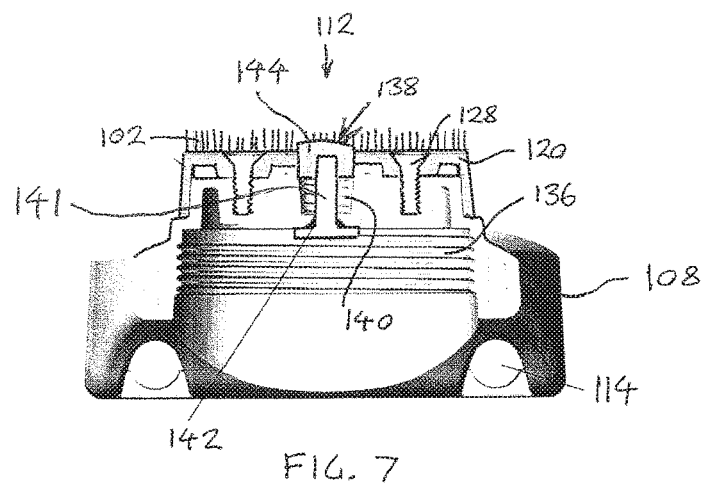
FIG. 7 is a sectional view of an applicator head of the lubricant applicator of FIG. 5.

Turning to FIG. 7, the applicator head 108 defines an internal thread 136 for complementarily engaging with an outer thread at the top of the lubricant reservoir 106. The absorbent felt liner 102 not only stores the excess lubricant, but is particularly well suited to lubricating within the thread of the fastener owing to the many constituent fibers bearing lubricant. Advantageously, the absorbent felt liner 102 can provide for even distribution of the lubricant outwardly from the centre.

The central spring-loaded valve 112 passes through the liner 102, liner support 120 and applicator head 108, and facilitates controlled release of the lubricant from the lubricant reservoir 106 to the liner 102. The valve 112 includes a stopper 138, and a compression spring 140 for biasing the stopper 138 in a normally closed configuration as shown in FIG. 7. The stopper 138 includes an inverted pin 141 (or screw) with a flared bottom end and a shaft for passing upwardly through a rubber O-ring 142 and the compression spring 140. A terminus 144 terminates the top of the pin 141 and has external grooves to allow for the upward passage of lubricant.

In order to operate the dispenser 100, the cap 132 is removed to expose the liner 102.

The terminus 144 of the stopper 138 is momentarily pressed downward with the fastener tail so that the desired amount of lubricant is expelled from the reservoir 132 and onto the liner 102. Once mounted, the dispenser 104 can be conveniently operated in this manner using only one hand. The compressed lubricant in the lubricant reservoir 106 passes up through the applicator head 108, annular liner support 120, annular liner 102 and onto the top surface of the liner 102.

The user can then roll or rub the threaded stem of the fastener over the absorbent liner 102 whilst concurrently rotating the stem. The lubricant can be evenly distributed in this manner both: from the centre to the outside of the liner 102; and around the stem of the fastener. The user can readily apply either a heavy or sparse lubricant coat in this manner, and any excess lubricant remains on the absorbent liner 102 to be used for the lubricant next application.

Figure 8:
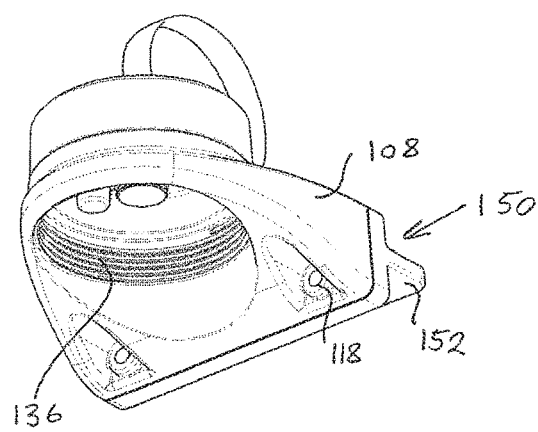
FIG. 8 is a lower perspective view of the applicator head of FIG. 7 with a vice tongue attachment.

FIG. 8 shows a vice tongue attachment 150 attached to the mounting interface 114 of the applicator head 108 with screws 118. The attachment 150 is T-shaped and defines a protruding tongue 152 which can be inserted into a clamp or vice and held.

Figure 9:
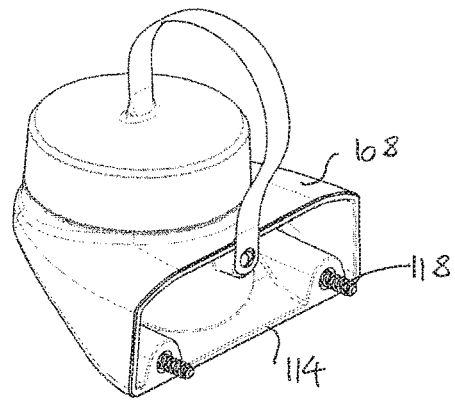
FIG. 9 is an upper perspective view of the applicator head of FIG. 7 demonstrating wall mounting.

FIG. 9 shows that the applicator head 108 can be directly screwed to a flat surface using screws 118 passing through the flat mounting interface 114.

A person skilled in the art will appreciate that many embodiments and variations can be made without departing from the ambit of the present invention.

For example, in an alternative embodiment, the receptacle 4 can be unitary and molded from plastics material.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The claims defining the invention are as follows:

1. An industrial lubricant applicator for applying lubricant to a fastener, the applicator including:
    engagement means for engaging with and applying lubricant to the fastener;
    a dispenser for dispensing lubricant to the engagement means and comprising a valve to facilitate controlled release of the lubricant, the valve including a stopper and biasing means for biasing the stopper in a normally closed configuration, the stopper including a pin with a flared end for passing through an O-ring and the biasing means, the stopper including an end for terminating the pin; and
    a lubricant reservoir for providing pressurised lubricant to the dispenser for release by the valve.

2. An industrial lubricant applicator as claimed in claim 1, wherein the engagement means includes a liner.

3. An industrial lubricant applicator as claimed in claim 2, wherein the liner includes absorbent felt for storing the lubricant and for lubricating within the thread of the fastener.

4. An industrial lubricant applicator as claimed in claim 1, wherein the valve can be opened using one hand to dispense lubricant by pushing the stopper.

5. An industrial lubricant applicator as claimed in claim 1, wherein the dispenser includes an applicator head defining an internal thread for engaging with a lubricant reservoir.

6. An industrial lubricant applicator as claimed in claim 5, wherein the applicator head further defines a central conduit for housing the valve and through which lubricant can be conveyed to the engagement means.

7. An industrial lubricant applicator as claimed in claim 5, wherein the head further includes a flat mounting interface to facilitate mounting of the dispenser.

8. An industrial lubricant applicator as claimed in claim 5, further including a support for supporting the engagement means and which is mounted to the applicator head.

9. An industrial lubricant applicator as claimed in claim 8, wherein the support and engagement means each define a central aperture through which lubricant can be conveyed and fastening holes for receiving fasteners extending into the head.

10. An industrial lubricant applicator as claimed in claim 1, further including a cap for capping the engagement means.

11. An industrial lubricant applicator as claimed in claim 10, further including a tether for tethering the cap.

12. An industrial lubricant applicator as claimed in claim 1, further including a magnetic fastener for fastening the applicator to a metallic surface, a screw fastener arrangement for fastening the applicator to a surface with screws, or a tongue fastening arrangement for being held in a clamp.

13. An industrial lubricant applicator as claimed in claim 1, wherein the dispenser can be mounted to facilitate one-handed operation of the applicator.

14. An industrial lubricant applicator as claimed in claim 1, wherein the lubricant reservoir includes:
    a replaceable lubricant canister;
    a housing for coupling to the dispenser and for housing the canister;
    a plunger for pushing lubricant from the canister; and
    a compression spring for pressing the plunger into the canister.

15. An industrial lubricant applicator as claimed in claim 14, wherein the lubricant reservoir further includes a handle which can be pulled to disengage the plunger and locked in position.

* * * * *